United States Patent [19]

Neumann

[11] Patent Number: 5,112,125
[45] Date of Patent: May 12, 1992

[54] SPECTRAL MICROSCOPE WITH A PHOTOMETER

[75] Inventor: Burkhard Neumann, Wetzlar, Fed. Rep. of Germany

[73] Assignee: Wild Leitz, GmbH, Wetzlar, Fed. Rep. of Germany

[21] Appl. No.: 566,385

[22] PCT Filed: Dec. 14, 1989

[86] PCT No.: PCT/DE89/00772
   § 371 Date: Aug. 24, 1990
   § 102(e) Date: Aug. 24, 1990

[87] PCT Pub. No.: WO90/07723
   PCT Pub. Date: Jul. 12, 1990

[30] Foreign Application Priority Data

Dec. 24, 1988 [DE] Fed. Rep. of Germany ....... 3843876

[51] Int. Cl.⁵ .............................. G01J 3/18; G01J 3/36
[52] U.S. Cl. ......................................... 356/73; 356/328
[58] Field of Search .......................... 356/328, 334, 73

[56] References Cited

U.S. PATENT DOCUMENTS

| | | | |
|---|---|---|---|
| 3,572,933 | 3/1971 | Boostrom | 356/334 |
| 4,181,436 | 1/1980 | Wasmund et al. | 356/225 |
| 4,351,611 | 9/1982 | Leif | 356/328 |
| 4,650,321 | 3/1987 | Thompson | 356/328 X |
| 4,674,883 | 6/1987 | Baurschmidt | 356/381 |
| 4,678,325 | 7/1987 | Lehtikoski et al. | 356/334 X |
| 4,818,110 | 4/1989 | Davidson | 356/358 |
| 4,844,617 | 7/1989 | Kelderman et al. | 356/328 |

FOREIGN PATENT DOCUMENTS

| | | |
|---|---|---|
| 2421185 | 11/1975 | Fed. Rep. of Germany . |
| 2542731 | 3/1977 | Fed. Rep. of Germany . |
| 3432252 | 3/1986 | Fed. Rep. of Germany . |

Primary Examiner—Vincent P. McGraw
Attorney, Agent, or Firm—Foley & Lardner

[57] ABSTRACT

A microscope with a Köhler illumination device having an at least approximately infinite beam (17) is described. An optical slit (6) is provided in the field diaphragm plane (LF) which is followed by an optical transmission grating (12) in the infinite (17). The resulting zero-order and first-order diffraction images are imaged either simultaneously or one after the other on a sensor (13). The spectral and densitometric distribution in a preselected object (10a) is determined by means of evaluation devices connected after the sensor (13). It is thereby possible, for example, to determine simultaneously the width of an object by means of the densitometric distribution and the height of an object by means of the spectral distribution.

26 Claims, 3 Drawing Sheets

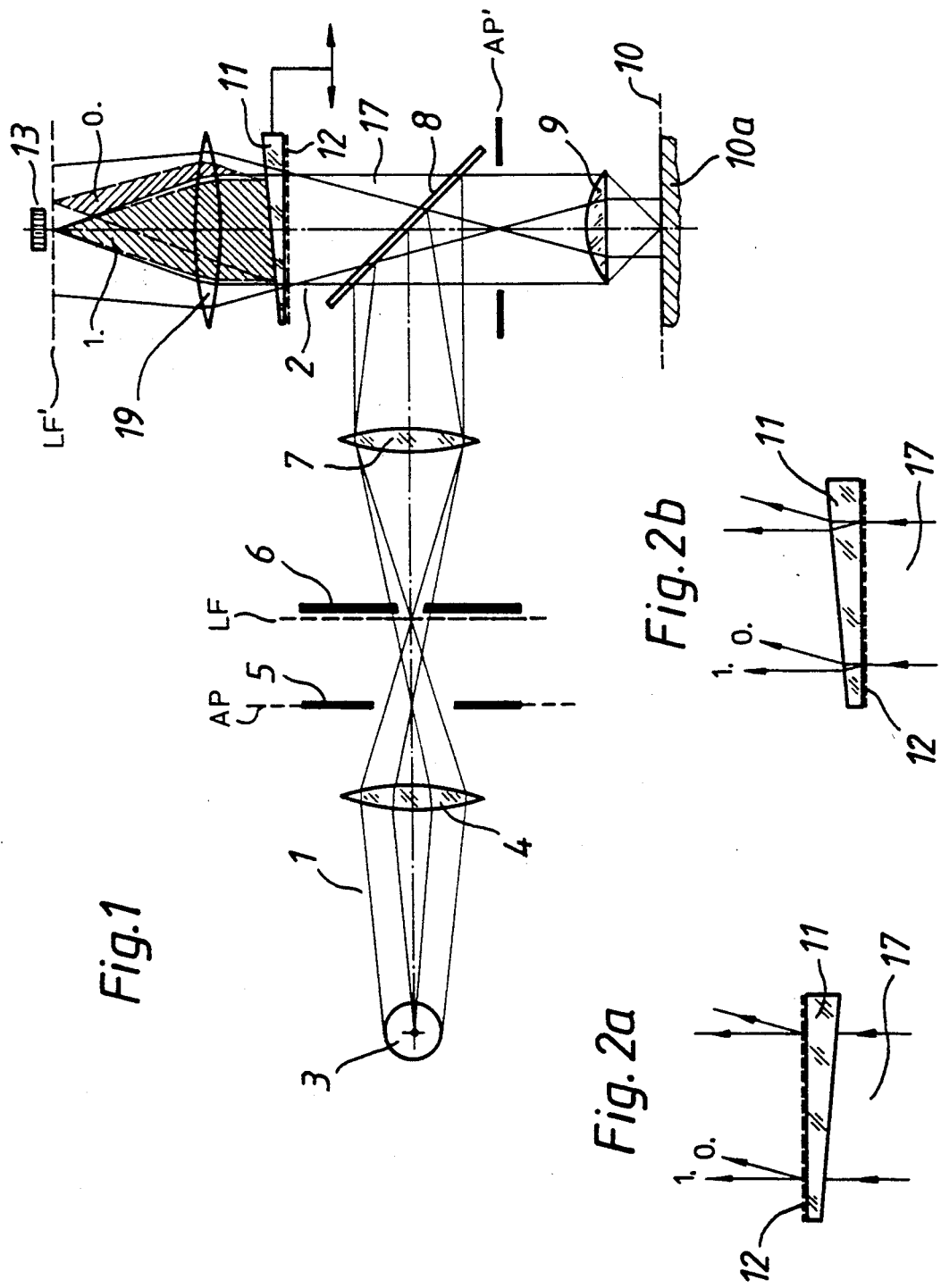

SPECTRAL MICROSCOPE WITH A PHOTOMETER

BACKGROUND OF THE INVENTION

The invention relates to a spectral microscope with a photometer.

Microscopes with a photometer and a monochromator (microspectrophotometer) serve to determine the spectral distribution of radiation. The object to be examined is here illuminated by a light source and the radiation altered by the object is measured. A microspectrophotometer of this type is known from German Offenlegungsschrift 2,542,731. This publication describes a microscope with separate retrofittable auxiliary devices which can be optionally attached to the microscope. One of these auxiliary devices has a grating monochromator with an entrance slit, a concave mirror and also an optical grating. The photometer is arranged in an auxiliary device and is connected to the monochromator via a further retrofittable attachment. By exchanging a plane mirror for the grating, this microscope can be used both as a spectrophotometer and as a pure photometer. The device described here is very expensive due to the high outlay for adjustment between the retrofittable constructional units and functional units. Moreover, with a device of this type it is not possible to measure a preselectable object point both densitometrically and spectrophotometrically at the same time.

A measuring microscope which has an attachable constructional unit for densitometric and spectrophotometric measurement of the light coming from the object is known from German Offenlegungsschrift 3,432,252. For this, an optical slit is provided in the constructional unit in an intermediate image plane of the object. Following this is a partially transmitting mirror for producing two separate beams. One of these beams contains a photometer with photomultiplier, while the concave reflection grating and also a diode array for spectrophotometric measurement are arranged in the other beam. Besides the expensive construction, with this measuring microscope it is only possible to measure in the optical axis, so that the measuring surface of the object can only occur by a displacement of the object with a scanning stage. In addition, it is not possible here to make the slit image and the associated spectral lines visible in the eyepiece.

SUMMARY OF THE INVENTION

It is therefore the object of the present invention to equip a conventional microscope for a densitometric and spectrophotometric object measurement with simple means and thereby also permit both measurements simultaneously.

This object is achieved by the invention by the characterizing features of claim 1. Further advantageous refinements form the subject-matter of the subclaims.

With this device it is possible, in particular by using a surface sensor, to record the zero-order and first-order diffraction images simultaneously. A spectrum and a photometrically determined luminous quantity can be assigned to each object point as a function of the entrance slit of the monochromator. In this way, for example the width of structures of an object are determined with the photometer and at the same time the height of the respective object structure is determined from the spectrum. Each object point can thus simultaneously contain two measurable pieces of information (area and height).

If a scanning stage is used on the microscope, in addition it is possible to carry out time-resolved spectral measurements and time-resolved densitometric measurements. It is thus even possible, for example, to determine automatically luminescence decay times of a particle that has been excited.

Owing to the extremely simple construction, already available microscopes can be retrofitted, it being possible to use such a measuring microscope for conventional observations again without laborious conversion.

BRIEF DESCRIPTION OF THE DRAWINGS

The invention is described in greater detail below with reference to diagrammatically illustrated exemplary embodiments. In the figures:

FIG. 1 : shows the beams of a microscope,

FIG. 2a: shows an optical wedge with optical transmission grating arranged thereon, FIG. 2b: shows an optical wedge with optical transmission grating arranged thereon.

DETAILED DESCRIPTION OF PREFERRED EMBODIMENTS

Figure 3:
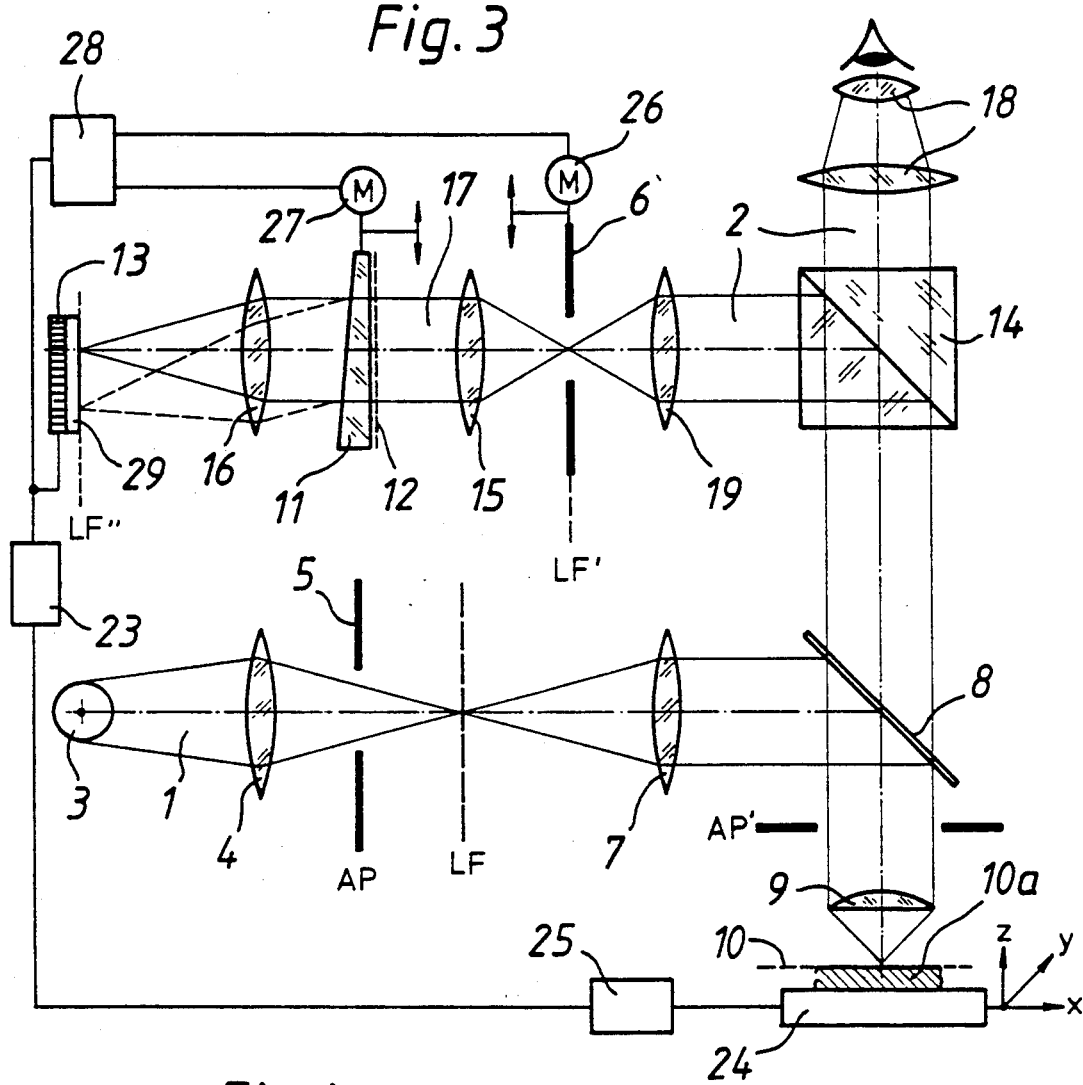
FIG. 3 : shows an illumination beam with incident illumination.

FIG. 1 shows an illuminating beam 1 and also, arranged vertically thereto, an observing/measuring beam 2 of a microscope (not shown in greater detail). The illuminating beam 1 has, starting from a light source 3, a collector lens 4 and also an aperture diaphragm plane AP in which an adjustable diaphragm 5 is arranged. In the further course of the illuminating beam 1 is arranged a field diaphragm plane LF with an adjustable optical entrance slit 6 arranged therein and also a lens system 7. By means of a subsequently arranged divider mirror 8, the illuminating light of the light source 3 is reflected into the observing/measuring beam 2 and is imaged on the object 10a via the objective aperture AP' and the objective 9. The objective 9 is a system imaging to infinity, so that a part of the observing/measuring beam 2 is imaged as infinite beam 17. Arranged in the latter following the dividing mirror 8 are an optical wedge 11, an optical transmission grating 12 and also a tube lens 19. An image of the object 10a is produced in the intermediate image plane LF' by means of the tube lens 19. A sensor 13 is arranged in the plane LF'. A microscope eyepiece is not shown in FIG. 1. However, the object can also be viewed via a monitor following the sensor 13. In addition, it is also possible to provide a further divider mirror in the observing/measuring beam 2 which reflects a part of the light out of the object plane 10 into an eyepiece (not shown).

The illuminating beam 1 shown here exhibits Köhler illumination since, by means of the collector lens 4, the light source 3 is imaged in the aperture diaphragm plane AP, the aperture diaphragm 5 via the lens system 7 and also via the objective 9 is imaged to infinity, and the field diaphragm (entrance slit 6) with the objective 9 is imaged in the object plane 10.

The optical entrance slit 6 and the optical transmission grating 12 form a monochromator. The angle between the zero-order and first-order diffraction images is compensated exactly by the optical wedge 11 and the deflection images are imaged separately from one another in the intermediate image plane LF'. In this arrangement, the first-order diffraction image contains individual spectral lines and the zero-order image contains the slit image. As as a result of the spatial separation of the two images, it is possible to determine the spectrum from the first-order image and the respective density distribution from the zero-order image at the same time.

FIGS. 2a and 2b show variants in the embodiment of the optical wedge 11 and of the optical transmission grating 12. In this case, both can be designed as an integral component. In FIG. 2a, the light incident from the object plane 10a is first of all diffracted by the angle between the zero and first order. Following this, the light is spectrally separated at the transmission grating 12. In FIG. 2b, first of all the spectral separation and, with the optical wedge 11, the displacement of the spectrum by the angle of diffraction takes place.

FIG. 3 shows a variant in the arrangement of the monochromator consisting of slit 6 and transmission grating 12. Both are arranged in a separate beam so that the observation of the object 10a via the eyepiece 18, as already explained with reference to FIG. 1, is retained. The illuminating beam 1 shown here has, in analogy to FIG. 1, a light source 3, a collector lens 4, an aperture diaphragm 5, a field diaphragm plane LF and a lens system 7. By means of the divider mirror 8, the field diaphragm plane LF is imaged by means of the Köhler illumination (not shown here in greater detail) via the objective 9 in the object plane 10. In contrast to the exemplary embodiment according to FIG. 1, the observing/measuring beam 2 has an additional divider mirror 14 which reflects out a part of the light coming from the object plane 10. An intermediate image of the object 10a or an intermediate image of the field diaphragm plane LF is produced by means of the tube lens 19. The optical entrance slit 6 is arranged in said plane LF'. An image of the intermediate image plane LF' is produced in a further plane LF" by means of a subsequently arranged lens system 15, 16. The surface sensor 13 is provided in said plane LF". The lens system 15, 16 is designed in such a way that there is an at least approximately parallel beam path between the lenses. The transmission grating 12 with optical wedge 11 is provided in this infinite beam 17. A motor-driven adjusting means 26 is associated with the optical slit 6 of the monochromator. Both the height and the width of the slit 6 can be altered by means of this adjusting means 26. Furthermore, a further motor-driven adjusting means 27 is associated with the transmission grating 12 and with the optical wedge 11. Said adjusting means serves for the exact insertion/removal of the combined wedge-transmission grating 11, 12 into/from the observing-/measuring beam 2 or infinite beam 17. Both adjusting means 26, 27 are electrically connected to a control device 28, which in turn is connected to a combined computing/evaluating circuit 23. An image intensifier 29 is assigned to the surface sensor 13 illustrated here. Both are electrically connected to the computing-/evaluating circuit 23. In addition, the microscope (not shown in greater detail) has a scanning stage 24 which is adjustable in x, y and z direction. A further control device 25 which is electrically connected to the combined computing/evaluating circuit 23 is provided for controlling the stage 24.

The advantages of the exemplary embodiment illustrated in FIG. 3 are conferred, inter alia, by the fact that conventional observation methods via an eyepiece 18 are retained, and at the same time it is possible to make spectral and/or densitometric measurements. In addition, it can be seen from this beam that the monochromator can be used as a retrofittable component on an already available microscope in a simple manner. Of course, the entrance slit 6 with its adjusting means 26 can also be arranged in the field diaphragm plane LF.

Figure 4:
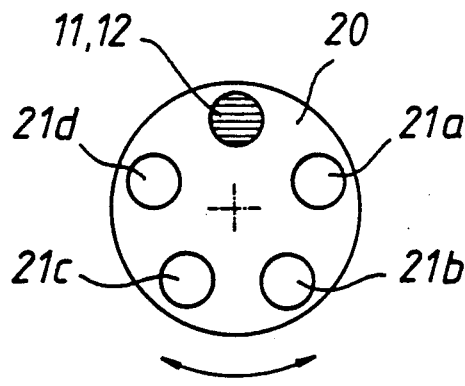
FIG. 4 shows a filter turret with wedge and optical transmission grating.

FIG. 4 shows a variant in the embodiment of the combined optical wedge 11 with the transmission grating 12. Both components are here provided on a rotatably arranged filter turret 20 (cf. double arrow), further filters 21a to 21c being provided for rapidly switching over to other microscopic methods. One of the available positions is expediently designed as free light passage 21d. Of course, it is also possible for the individual positions 21a-21d to be occupied by different transmission gratings 12. In this case, both different grating constants and transmission gratings with different grating orientation and grating form can be used. Furthermore, a changing device 20 of this type can be coupled to the adjustable optical entrance slit 6 so that the latter is automatically swung out of the beam for the conventional microscope method.

Figure 5:
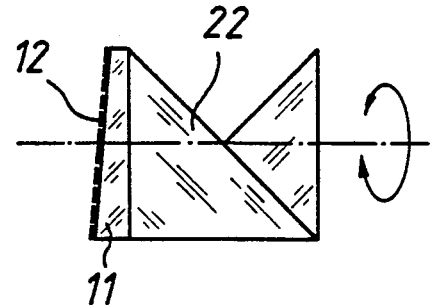
FIG. 5 : shows the optical wedge with an associated rotating prism.

FIG. 5 shows a further variant of the optical wedge 11 with the optical transmission grating 12. A prism 22 is assigned here to both optical components. The prism can be arranged so as to be rotatable (cf. double arrow) in the infinite beam 17. In this way, the spectrum first-order diffraction image) can be aligned precisely on the sensor 13. With this arrangement, transmission gratings of different orientation can be replaced by identical grating constants.

Figure 6:
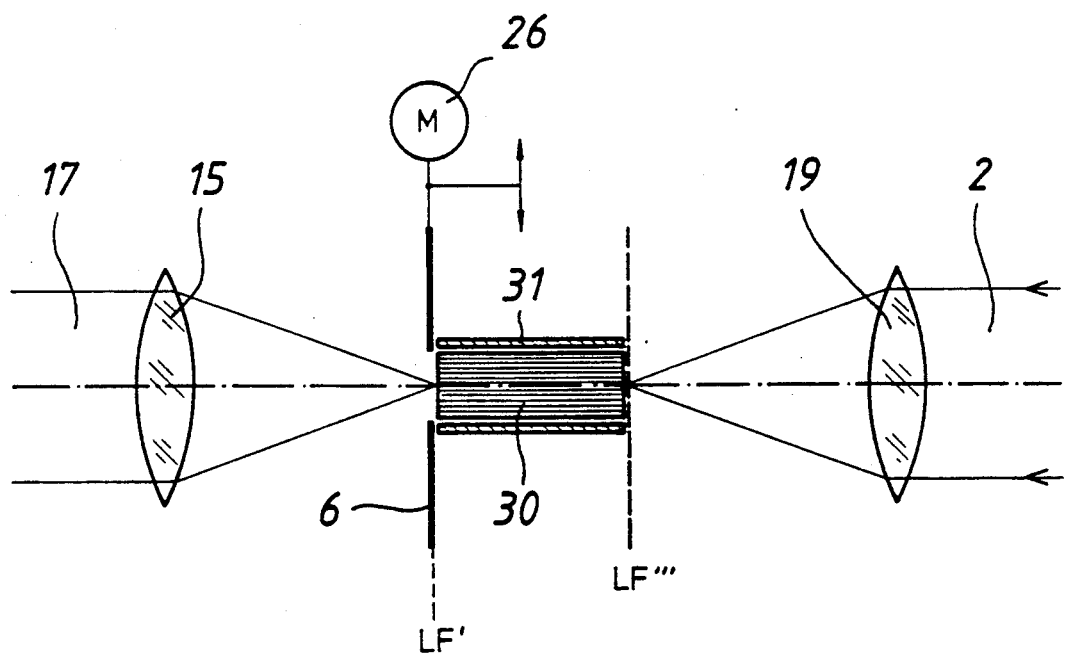
FIG. 6 : shows an image guide arranged between two conjugated field diaphragm planes.

FIG. 6 shows a section from FIG. 3. Provided between the lenses 15 and 19 is an image guide 30 which is arranged exactly between the planes LF'" and LF' conjugated with respect to the field diaphragm plane LF. The image guide 30 has a cladding 31 designed as protective tube for mechanical stabilization. The guide 30 serves to transmit the image over greater distances and has light-conducting fibers positioned exactly with respect to one another. It is however also possible to arrange the light-conducting fibers twisted inside the image guide 30 so that the entire image is rotated by a given angle (e.g. 90° or 180°) at the light exit area LF'. The order and position of the individual fibers with respect to one another must of course remain in unchanged form from the light entrance area LF'" to the light exit area LF'. In addition, the light entrance area LF'" and/or the light exit area LF' of the image guide 30 may already be designed as slit diaphragm 6.

As a result of the Köhler illumination realized, it is also possible to image a slit image on the object 10a or in the object plane 10 (FIG. 1), or also to remove a slit image from the observing/measuring beam 2 (FIG. 3). This split image is followed by an optical transmission grating 12 which is always provided in an at least approximately parallel beam 17. The consequent spectral separation of the light is imaged by means of further subsequent lenses (19, FIG. 1; 16, FIG. 3) in a further plane LF'; LF" conjugated to the object plane 10. In this case, the zero-order diffraction image carries the densitometric information and the first-order image carries the spectral information. The densitometric measurement can be used for determining the structure widths. At the same time, the respective height information can be obtained from the spectrum, since a spectrum is produced for every point within the slit 6. For determining the height and width information, it is however necessary for all the heights with their respective spectra to have been recorded in a calibration process previously carried out.

In order to determine position-resolved spectra and densitometric measured values simultaneously, it is necessary to design the sensor as CCD surface array. For spectral analysis, the sensor must have a polychrome receiving characteristic. However, individual diode arrays, a video camera or also a combination of an image intensifier with a camera are also suitable.

For measurements of static object points, it is also possible to remove the transmission grating 12 and the wedge 11 or only the wedge 13 from the observing/measuring beam 2, in order thereby to make the densitometric and spectrophotometric measurements one after the other. In particular, this is made possible by the fact that the wedge 11 compensates exactly the angle of diffraction between the zero-order and first-order.

The sensitivity and resolution of the described measuring arrangement are functions of the transmission grating, of the sensor and of the focal lengths present in the microscope. By altering the stated parameters, it is of course possible to vary the conditions for special applications. The described arrangement can be employed not only in transmitted light, but also with all other types of illumination. Thus, for example, luminescence decay times of a particle that has been excited or time-resolved spectroscopy are also possible. This presupposes only that a scanning stage 24 or a particle flow is used in addition besides the customary fluorescence filters. The particle excited with fluorescent illumination can be moved constantly by means of the scanning stage 24 or the particle flow. As a result, the respective spectra can be measured one after the other, assigned to the displacement path and the respective fluorescence decay times can be determined.

LIST OF REFERENCE SYMBOLS

1 Illuminating beam
2 Observing/measuring beam
3 Light source
4 Collector
5 Aperture diaphragm
6 Optical entrance slit of the monochromator
7 Lens system
8 Divider mirror
9 Microscope objective
10 Object plane
10a Object
11 Optical wedge
12 Optical transmission grating
13 Sensor
14 Divider mirror
15 Lens system
16 Lens system
17 Infinite beam
18 Eyepiece
19 Tube lens
20 Filter turret
21a-21d Individual filter/individual transmission grating
22 Rotating prism
23 Computing/evaluating device
24 Scanning stage
25 Control device for 24
26 Adjusting means for 6 (motor)
27 Adjusting means for 11, 12 (motor)
28 Control device for the adjusting means (26; 27)
29 Image intensifier
30 Image guide
31 Cladding of 30 (protective tube)
AP Aperture diaphragm plane
AP' Objective aperture
LF Field diaphragm plane
LF' First intermediate image of the field diaphragm plane
LF" Second intermediate image of the field diaphragm plane
LF'" Third intermediate image of the field diaphragm plane

I claim:

1. A microscope comprising:
a photometer for measuring an intensity distribution of light in an object plane; and
a grating monochromator for measuring a spectral composition of light coming from an object, wherein an optical slit for measuring a surface of the object is located in a plane conjugated relative to the object plane, and wherein a combined observation-measuring beam path of the microscope includes an infinite beam path where an optical transmission grating is located, a slit image of the object being passed through the transmission grating and wherein diffraction patterns of zero order and first order diffraction are reproduced on at least one subsequent optical planar sensor.

2. A microscope according to claim 1, wherein the sensor includes a CCD surface array.

3. A microscope according to claim 1, wherein the sensor includes a diode array.

4. A microscope according to claim 1, wherein an image intensifier is associated with the sensor.

5. A microscope according to claim 1, wherein the sensor has a polychrome receiving characteristic.

6. A microscope according to claim 1, wherein a combined computing/evaluating device is associated with the sensor.

7. A microscope according to claim 1, wherein an optical element designed as a wedge is associated with the optical transmission grating for compensating an angle of diffraction.

8. A microscope according to claim 7, wherein a rotatably arranged prism is associated with the transmission grating and the wedge.

9. A microscope according to claim 1, wherein a filter changing device designed as a turret is arranged in the infinite beam, and has at least one grating.

10. A microscope according to claim 9, wherein the turret has a plurality of gratings with at least one of different grating constants and different grating orientations.

11. A microscope according to claim 6, wherein the combined computing/evaluating device is designed for simultaneous reception and for evaluation of a plurality of diffraction images and is electrically connected to the sensor.

12. A microscope according to claim 11, wherein one of the diffraction images on the sensor contains information about a spectral distribution and another contains densitometric information.

13. A microscope according to claim 1, wherein the microscope has an automatically controllable scanning stage.

14. A microscope according to claim 1, wherein the microscope has a particular flow unit.

15. A microscope according to claim 13, wherein the microscope has a fluorescence unit.

16. A microscope according to claim 13, wherein a control device is associated with a computing/ evaluating device and is electrically connected to one of the scanning stage and a particle flow unit.

17. A microscope according to claim 1, wherein an adjusting means for varying slit width and slit height is associated with an optical slit.

18. A microscope according to claim 1, wherein an adjusting means for insertion into or removal from the infinite beam is associated with at least one of the transmission grating and/or and a wedge.

19. A microscope according to claim 17, wherein the adjusting means is electrically connected to a control device.

20. A microscope according to claim 1, wherein the monochromator and the sensor are arranged in a separate housing.

21. A microscope according to claim 20, wherein the housing is designed as a retrofittable constructional unit and is connected to the microscope by coupling elements.

22. A microscope according to claim 1, further including a plurality of moveable optical slits of variable area.

23. A microscope according to claim 1, wherein an image guide is arranged between two conjugated planes of a field diaphragm.

24. A microscope according to claim 23, wherein the image guide has in its interior from a light entrance up to a light ext exactly aligned light-conducting fibers.

25. A microscope according to claim 23, wherein at least one of a light entrance area and a light exit area of the image guide is designed as a slit.

26. A microscope according to claim 23, wherein the image guide has a cladding for mechanical stabilization.

* * * * *